United States Patent [19]
Bantli et al.

[11] Patent Number: 5,608,391
[45] Date of Patent: Mar. 4, 1997

[54] ELECTRONIC LICENSE PLATE ARCHITECTURE

[75] Inventors: Heinrich Bantli, Stillwater; Edmund J. Ring, Circle Pines; Wayne M. Thomas, Maplewood, all of Minn.

[73] Assignee: Minnesota Mining and Manufacturing Company, St. Paul, Minn.

[21] Appl. No.: 438,951

[22] Filed: May 11, 1995

[51] Int. Cl.⁶ .................................................. G08G 1/01
[52] U.S. Cl. ........................... 340/933; 340/941; 342/51
[58] Field of Search .................................. 340/933, 928, 340/941, 825.54; 362/83.2; 342/44, 51; 343/711, 713

[56] References Cited

U.S. PATENT DOCUMENTS

| | | | |
|---|---|---|---|
| 4,001,822 | 1/1977 | Sterzer | 343/6.5 |
| 4,730,404 | 3/1988 | Utsch | 40/209 |
| 5,019,815 | 5/1991 | Lemelson et al. | 340/933 |
| 5,105,179 | 4/1992 | Smith | 340/461 |
| 5,115,245 | 5/1992 | Wen et al. | 342/175 |
| 5,204,675 | 4/1993 | Sekine | 340/933 |
| 5,282,158 | 1/1994 | Lee | 365/96 |
| 5,286,679 | 2/1994 | Farnworth et al. | 437/209 |
| 5,396,233 | 3/1995 | Hofmann | 340/933 |

FOREIGN PATENT DOCUMENTS

| | | | |
|---|---|---|---|
| 0313747 | 5/1989 | European Pat. Off. | B60R 13/10 |
| 6-32619 | 8/1994 | Japan | H01Q 1/32 |
| 2222017 | 2/1990 | United Kingdom | B60R 13/10 |
| 2256072 | 11/1992 | United Kingdom | G08G 1/017 |
| 2227866 | 5/1993 | United Kingdom | G08G 1/017 |
| WO93/11517 | 6/1993 | WIPO | G08B 13/24 |

Primary Examiner—Jeffery Hofsass
Assistant Examiner—Daniel J. Wu
Attorney, Agent, or Firm—Gary L. Griswold; Walter N. Kirn; Kari H. Bartingale

[57] ABSTRACT

An electronic license plate architecture is described wherein a license plate portion has a conventional license plate having visual information thereon and an identification device integrated therewith. The identification device stores restricted information. A license plate holder supports the license plate portion and houses communications and signal processing electronics. An antenna may be integrated with the license plate portion or may be housed in the license plate holder.

14 Claims, 12 Drawing Sheets

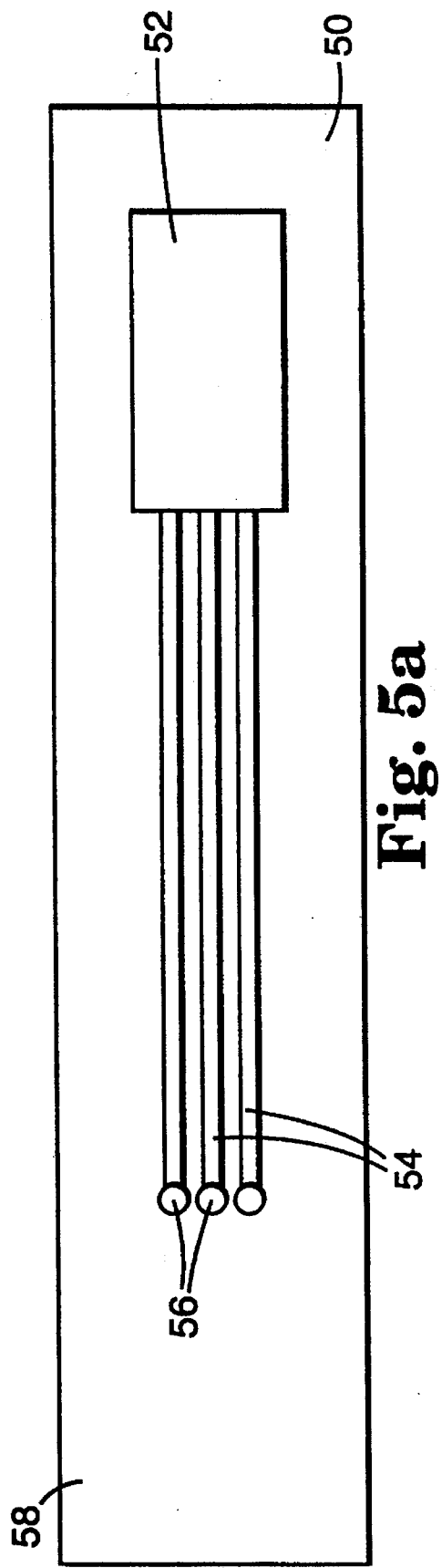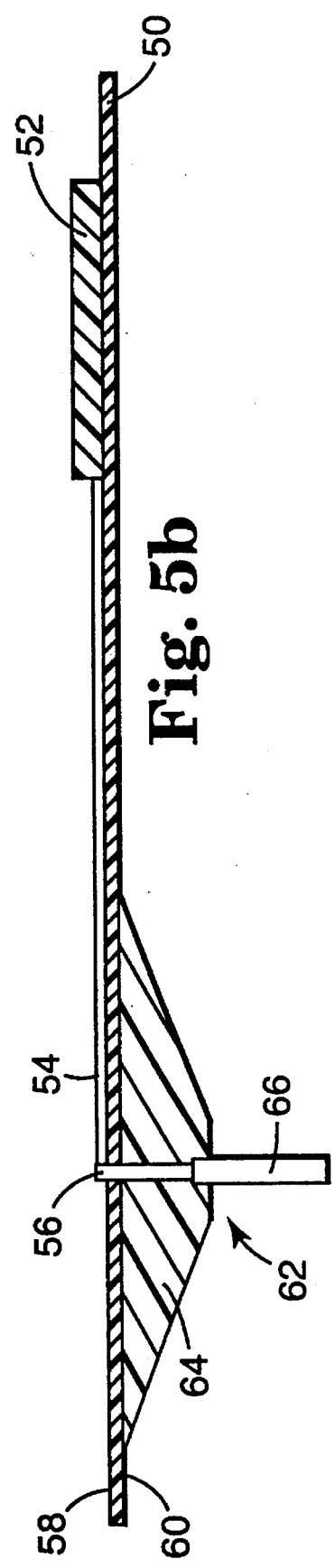
Fig. 5a
Fig. 5b

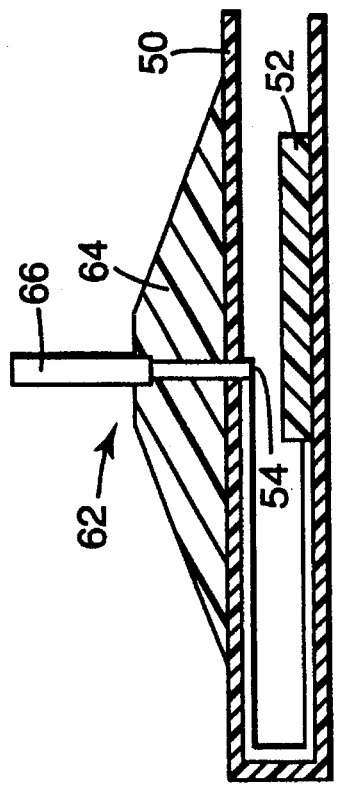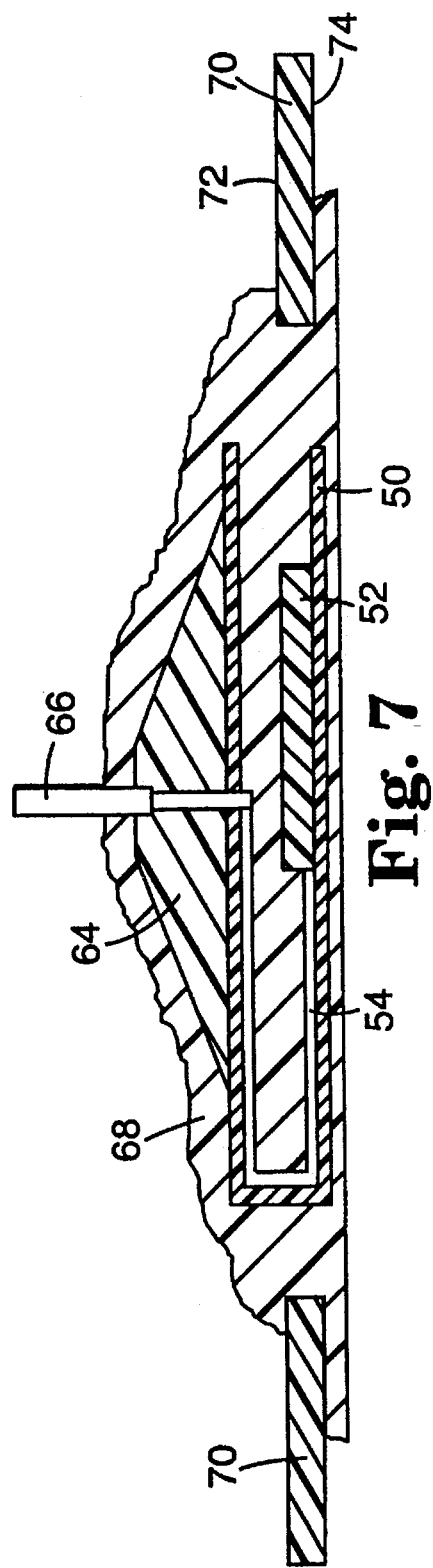

ELECTRONIC LICENSE PLATE ARCHITECTURE

FIELD OF THE INVENTION

The present invention generally relates to electronic license plates and electronic signs for use in electronic vehicular identification and communication systems as well as in vehicle to roadside or vehicle to vehicle communication systems. More specifically, it relates to electronic license plate architectures wherein permanent or restricted information is electronically embedded in electronic components in the license plate portion of the system and the remaining system electronics reside in other structures.

BACKGROUND OF THE INVENTION

With the ever increasing volume of traffic on roadways, there is a need for more efficient and safer traffic management. The need for local, unidirectional or bi-directional communication, involving specific vehicles and specific information, or between the roadside and vehicles, has been accomplished by various schemes. Some schemes include directional antennas, selected radio frequencies, both continuous and pulsed, and signal encoding. Electronic license plates have also been developed for such local communication. Electronic license plates are license plates that provide both visual information as traditional license plates provide, as well as electronic information and communication. The electronic information can be used for automatic vehicle identification for toll collection purposes or for identification of special vehicles, such as buses to improve scheduling, and police cars and ambulances to improve the efficiency of dispatching such vehicles. Highway vehicles can be electronically monitored by law enforcement agencies. Currently, police use license plates to visually identify vehicles. With electronic license plates, police can use the visual information in conjunction with radio frequency interrogation systems to electronically request and receive the same information provided visually by the license plate, as well as other information, such as the validity of required on-board documents, such as insurance, registration or emission certificates. Other uses of systems using the electronic communication capabilities of electronic license plates include automatic restriction of areas to certain vehicles, traffic control, vehicle theft protection, toll collection, collision avoidance and emergency message communication.

One way to provide electronic information in addition to the visual information is to provide an electronic module in a vehicle for electronically communicating with an interrogator. For example, in U.K. Patent Application GB 2,256, 072A to Matsushita Electric Industrial Co. Ltd., a road antenna from an automatic vehicle identification system receives, by radio, data from an identification transponder which is separate from the license plate and is located inside the vehicle. While having an electronic module separate from the license plate accomplishes the goal of providing both electronic and visual information, it is further desirable to have both integrated into a single unit for ease of installation, the ability to use existing structures on vehicles for installation, to optimize antenna location for low power communication between the roadside and the vehicle and to ensure that the visual and electronic information is consistent. Further, it is desirable to have both integrated into a single unit for security reasons. For example, the module containing the electronic information could be stolen from a vehicle and placed inside another vehicle to provide incorrect billing information for a toll collection system.

An example of an integrated electronic license plate wherein both visual and electronic information are provided in a unitary structure is disclosed in U.S. Pat. No. 4,001,822 to Sterzer. The Sterzer electronic license plate has a plurality of layers. The top layer is an electrically non-conductive layer having visual information printed on it where the visual information is similar to the information on a conventional license plate. Behind the top layer are two antenna networks disposed on both sides of a dielectric substrate, a harmonic generator, a signal detector, a connector, internal memory, and an integrated circuit chip to provide the encoder function of the system. This dielectric layer thus serves as a substrate upon which the electronic components of the system are placed and interconnected by printed wire connections. Another non-conducting layer is placed behind the dielectric substrate to provide protection for the antenna network. The antenna networks can receive an interrogation signal from a microwave transmitter and transmit an identification signal in response to the interrogation signal. The Sterzer license plate derives a harmonic signal from the interrogation signal and re-radiates the identification signal at the harmonic frequency. The license plate may further receive external coding from the vehicle.

Integrated electronic license plates are relatively expensive as compared to conventional license plates. Integrated electronic license plates not only include the visual information and structure that conventional license plates have, but also include a number of more costly components, such as the antenna network, the communications electronics and the signal processing electronics. Many states require that license plates are replaced periodically to ensure the integrity of the structure and the quality of the visual information. The expense associated with periodically replacing integrated electronic license plates such as described by Sterzer, however, could be unacceptable.

Integrated electronic license plates integrate all the electronics into a single unit. In many circumstances, however, it is desirable to have both permanent, or restricted, information, such as the license plate number or vehicle identification number, and variable information, such as billing information for toll collection or permit information. The restricted information is preferably stored in a secure location, such that only the issuing authority has access to modify such information while easily accessible electronics would preferably be provided for the variable information such that many organizations could access and utilize them. With integrated electronic license plates, however, the electronics storing such information is not configured in such a manner to allow both secure, permanent information and variable information stored in flexible electronics.

Visual communication of specific motor vehicle identification has long been accomplished by a license plate with a signature of the state and year of registration along with a unique identification number. Police departments and other organizations use the license plate number as identification of a vehicle. Therefore, it is important to such organizations that the license plate number was easily readable. In the past, the surface of the license plate was painted in a bright color for ease of reading the visual information. The optical efficiency of locating and reading license plates has been significantly enhanced by use of an optically retroreflective surface such as 3M brand Scotchlite™ Reflective License Plate Sheeting, manufactured by Minnesota Mining and Manufacturing Company of St. Paul, Minn., and printed with the appropriate vehicle designation.

With integrated electronic license plates, however, information associated with a vehicle can be communicated electronically, thereby obviating the need to visually read the license plate number when appropriate electronic readers are present. Moreover, because an electronic license plate can convey more information electronically than a standard license plate can visually, the electronic license plate has many additional uses, such as for obtaining vehicle classifications or permits, billing purposes in an electronic toll collection system or a restricted access road system. Because important information is contained on the electronic license plate, it is desirable that the electronic portion of the license plate is secure. More specifically, it is desirable that the portion of the electronics carrying restricted information about a specific vehicle such as the license plate number, expiration date or the vehicle identification number is secure such that they cannot be stolen and switched to another vehicle. It is also desirable, however, that the electronic license plate system provides flexibility in use, such that license plates can be replaced at a relatively low cost and that additional electronic information can be programmed into the system if desired without jeopardizing the integrity of the secured restricted information.

Similar to electronic license plates, electronic road signs have been developed for unidirectional or bi-directional communication between vehicles and the roadside, such as for in-vehicle signing. An electronic road sign has a surface with printed visual information for visual communication of desired information, such as toll collection, traffic control information or dangerous condition warnings. The electronic road sign also has a transmitter to electronically transmit information associated with the road sign. In-vehicle signing allows a vehicle on the roadway to electronically receive the information from the roadside transmitter and display the information inside the vehicle. Also, the information can be communicated by audio within the vehicle. The electronic road sign may also have a receiver to receive information from the vehicle, such as in toll collection to verify transactions, or from traffic management centers to update the message information to be delivered to a vehicle.

SUMMARY OF THE INVENTION

The present invention describes an electronic license plate architecture wherein a license plate portion communicates information visually and also has an identification device integrated in it. The identification device stores restricted information. A license plate holder supports the license plate portion as well as houses the electronics. An antenna for electromagnetic communication is placed either in the license plate portion or in the license plate holder.

BRIEF DESCRIPTION OF THE DRAWINGS

The present invention will be more fully described with reference to the accompanying drawings wherein like reference numerals identify corresponding components, and:

FIGS. 5a and 5b are a top view and a side cross-sectional view of a portion of an identification device of the present invention;

FIG. 6 shows the portion of the identification device of FIGS. 5a and 5b folded in half, FIG. 7 shows the identification device of FIG. 6 enclosed by molding and installed in a license plate substrate;

DETAILED DESCRIPTION OF A PREFERRED EMBODIMENT

In the following detailed description of the preferred embodiment, reference is made to the accompanying drawings which form a part hereof, and in which is shown by way of illustration of a specific embodiment of which the invention may be practiced. It is to be understood that other embodiments may be utilized and structural changes may be made without departing from the scope of the present invention.

Figure 1:
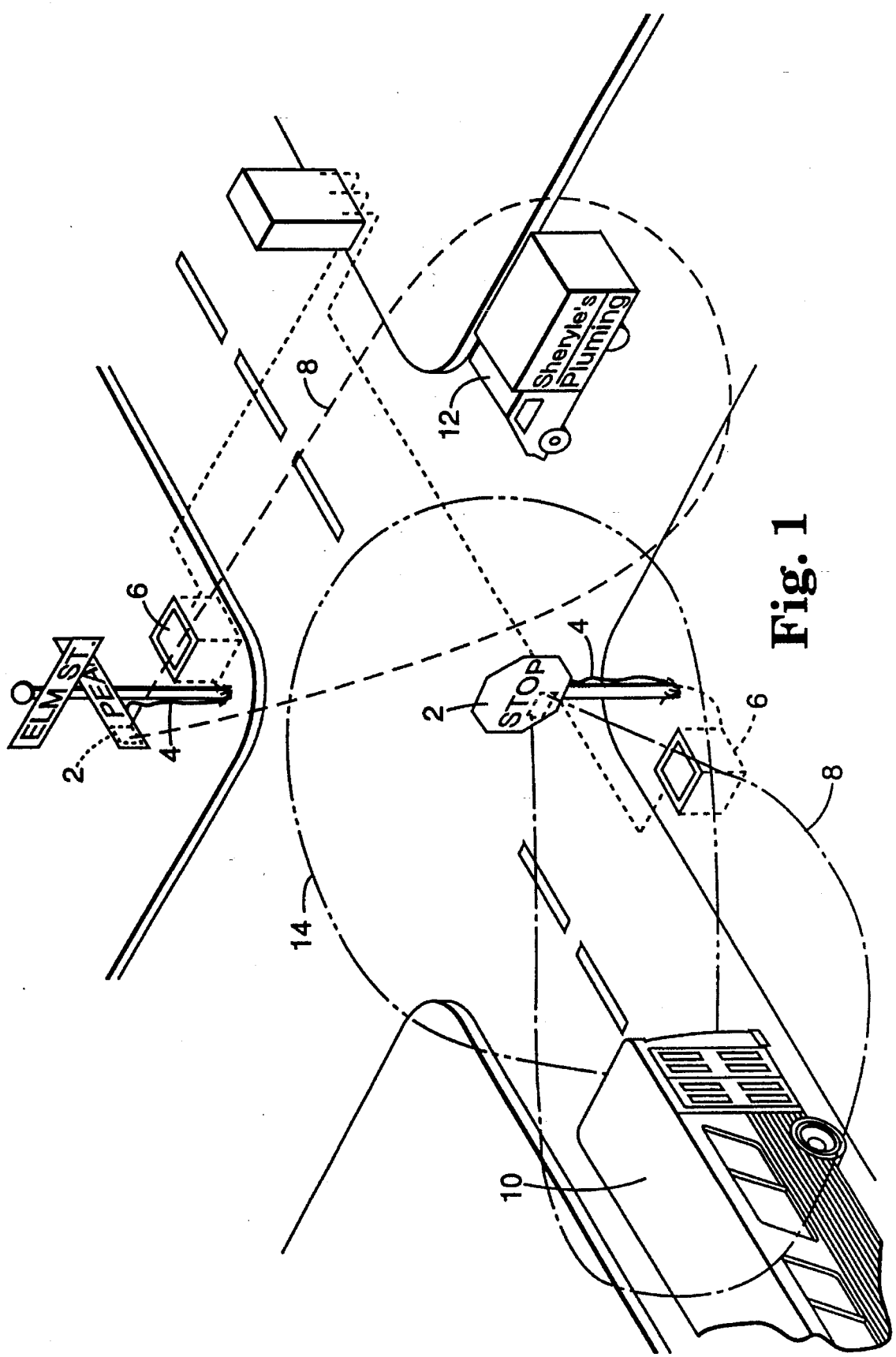
FIG. 1 is a perspective view of a roadway intersection where electronic signs and electronic license plate systems have been installed.

FIG. 1 is a perspective view of a roadway intersection where electronic signs have been installed and some vehicles are equipped with electronic license plates. Integrated electronic signs 2, in the form of a STOP sign and a street sign, communicate information to drivers of vehicles both visually and electromagnetically. Signs 2 are connected by cable 4 to interface unit 6, which may include a power source, electronics or a communication interface with a central traffic management center. Interface unit 6 is preferably buried in the ground to avoid congesting the roadside and to protect the components within the unit. Vehicles in the form of bus 10 and truck 12 include integrated electronic signage in the form of license plates (not shown), which are similar to signs 2 and communicate information both visually and electromagnetically. Antennas within signs 2 radiate fields 8, which communicate information electromagnetically. The electronic license plate of bus 10 is interactive, with a receive and a send mode, and radiates field 14 when sending information electromagnetically. The electronic license plate of truck 12, however, includes a less complex antenna system such as a passive backscatter system, and does not radiate a field.

Figure 2:
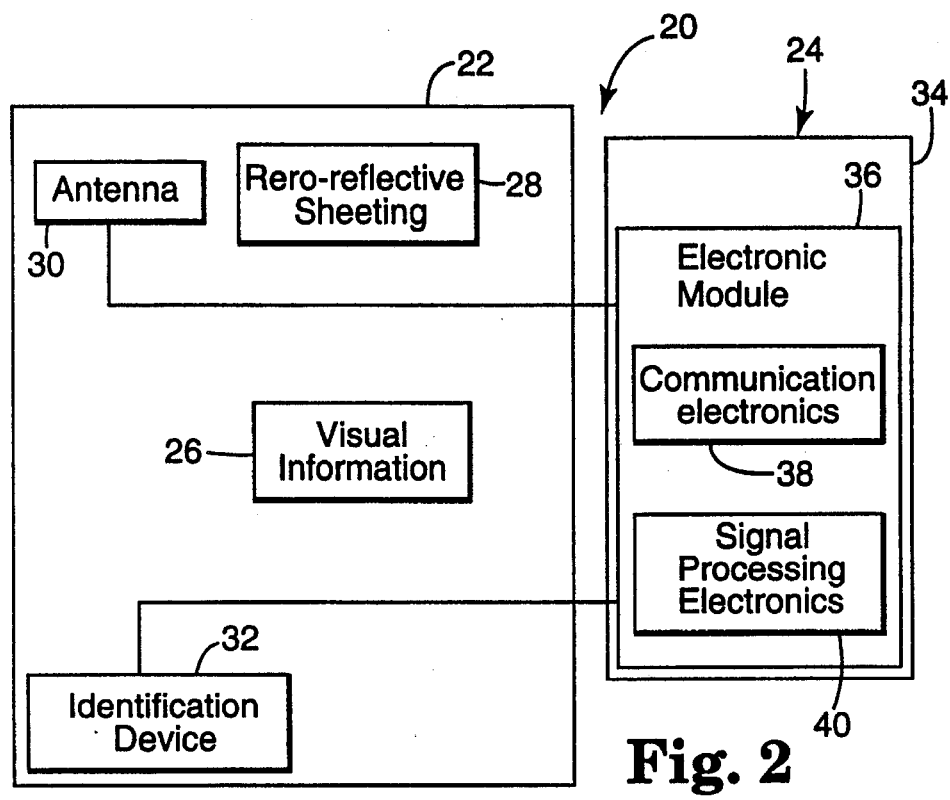
FIG. 2 is a schematic diagram of the electronic license plate system of the present invention.
Figure 3:
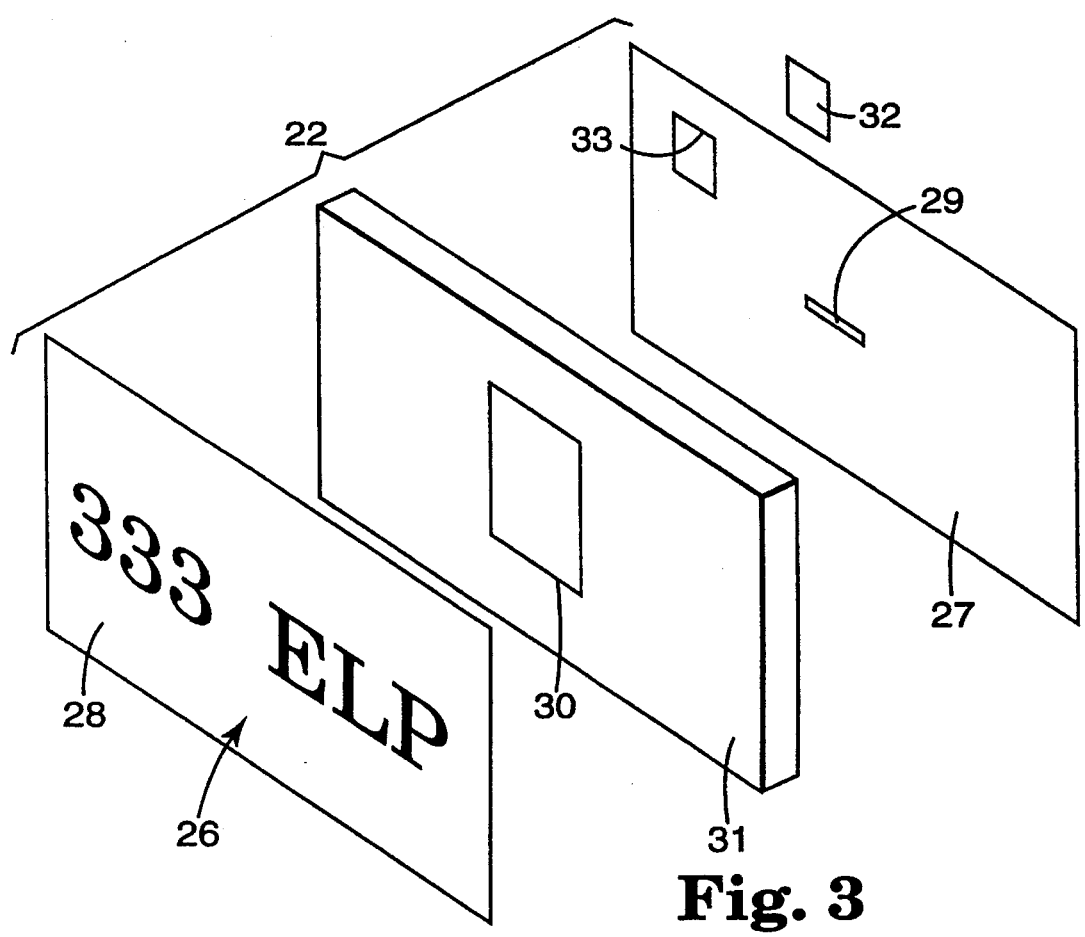
FIG. 3 is an exploded view of an electronic license plate portion of the present invention.
Figure 4:
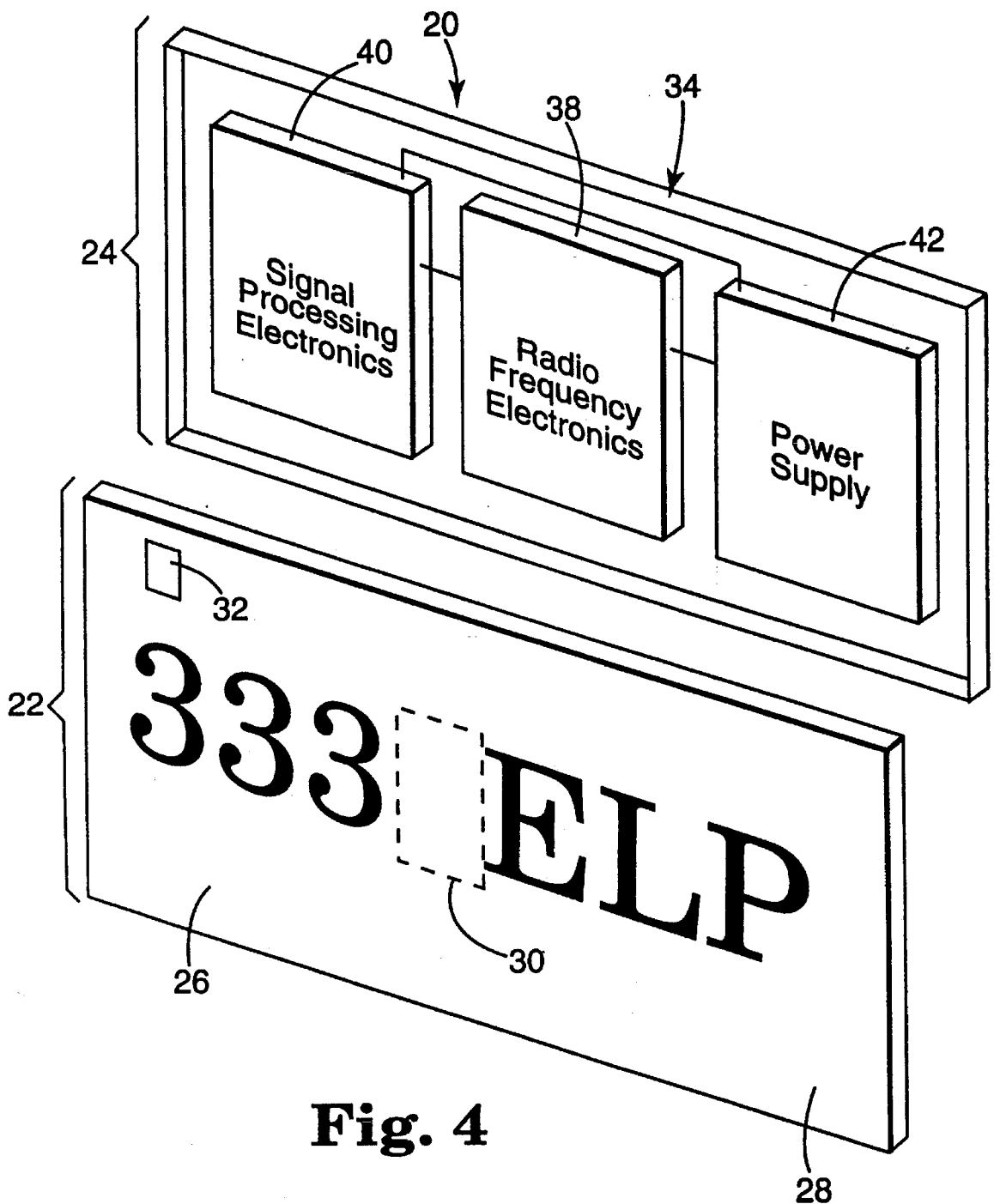
FIG. 4 is a partially exploded view of the electronic license plate system of the present invention.

FIG. 2 is a schematic diagram and FIG. 4 is an exploded view of an electronic license plate system of the present invention. Electronic license plate system 20 has two main portions, license plate portion 22 and license plate holder/electronics portion 24. FIG. 3 is an exploded view of license plate portion 22. License plate portion 22 contains a conventional license plate, such as those typically issued by a Department of Motor Vehicles of a state. The conventional license plate contains visual information 26, such as the license plate number, the expiration date of the license plate and the state issuing the license plate. To enhance the optical efficiency of locating and reading license plates, retroreflective sheeting 28 is often applied to license plate 22. Retroreflective sheeting 28 has an optically retroreflective surface such as 3M brand Scotchlite™ Reflective License Plate Sheeting, manufactured by Minnesota Mining and Manufacturing Company of St. Paul, Minn., and printed with the appropriate vehicle designation.

License plate portion 22 further can include antenna 30 for electromagnetic communication with other similarly equipped vehicles, electronic signs or other systems equipped with antennas for electromagnetic communication. Antenna 30 can be any type of suitable antenna. When integrating antenna 30 into license plate portion 22, however, it is preferable that antenna 30 is a planar antenna, such as a microstrip patch antenna placed on dielectric substrate 31. Conductive substrate 27 acts as a ground plane for antenna 30, conductive substrate 27 having an aperture 29 therethrough for aperture coupling to a transmission line (not shown) on the license plate holder portion 24 of the system. Conductive substrate 27 can further have an opening 33 therethrough or other suitable fastening means for placement of identification device 32. An example of such an electronic license plate having an integrated antenna is described in commonly-assigned U.S. patent application Ser. No. 08/196,294 entitled "Integrated Retroreflective Electronic Display" to Bantli et al., filed Feb. 14, 1994.

Figure 8:
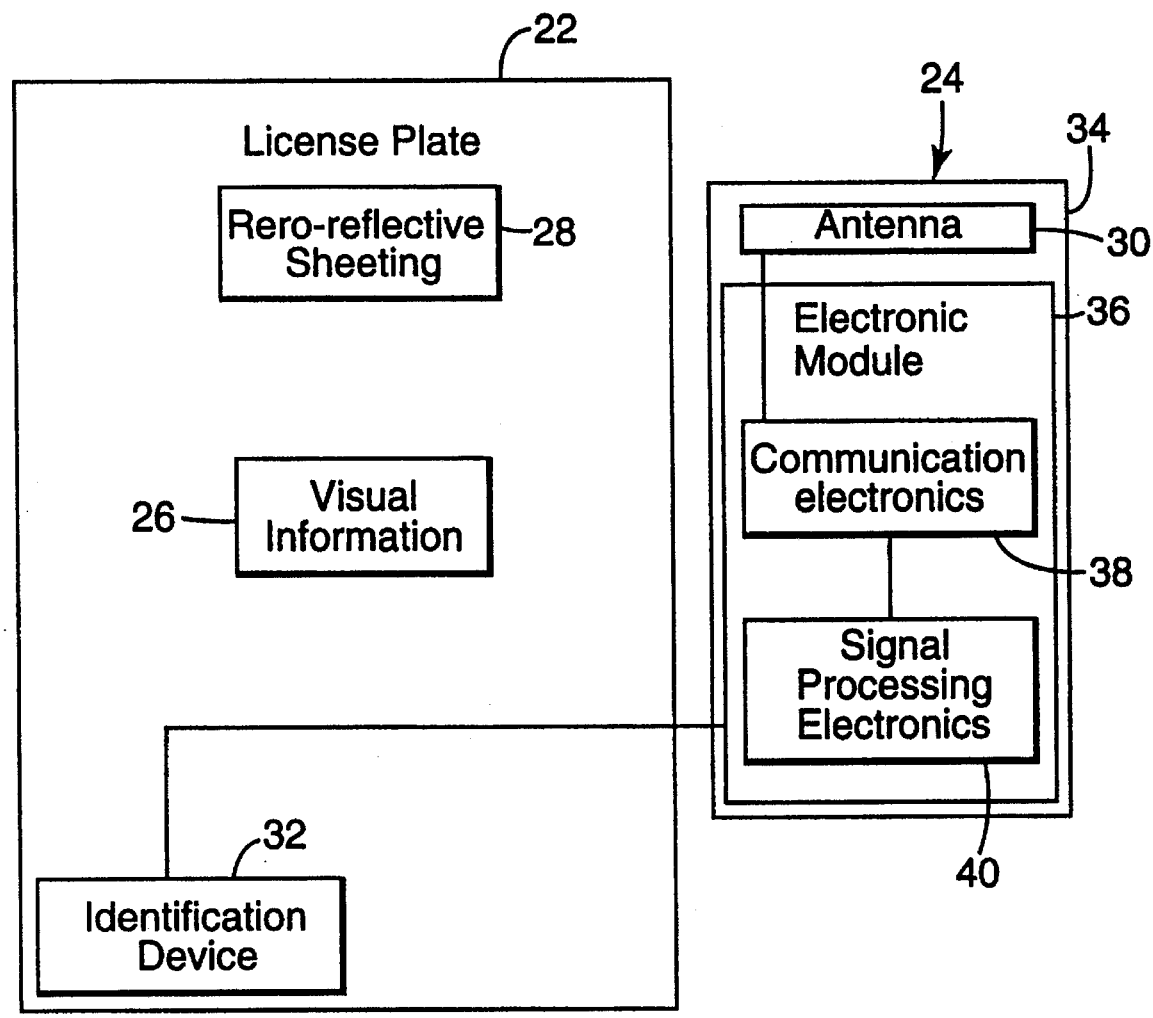
FIG. 8 is a schematic diagram of another embodiment of the electronic license plate system of the present invention.

In another embodiment, however, the antenna may be placed in license plate holder portion to simplify the components in license plate portion, to keep all electrical components, besides the secure identification device, together, and to lower costs on the replaceable portion of the system, namely the license plate portion. FIG. 8 shows an electronic license plate system that is the same as the electronic license plate system shown in FIG. 2 except that antenna 30 is located in license plate holder portion 24 instead of license plate portion 22. It is preferable that antenna 30 is located in a standard location, such as behind the license plate. By placing antenna 30 in license plate holder portion 24, potential problems arise because typical license plate retroreflective sheeting contains a vapor coat layer that disrupts a radiation pattern if an antenna is placed behind the retroreflective sheeting. Further, even if no retroreflective sheeting is used, or a purely dielectric retroreflective sheeting is used, the majority of license plates have a metal backing, such as aluminum, for support. Therefore, an alternative antenna location is desirable.

Figure 9A:
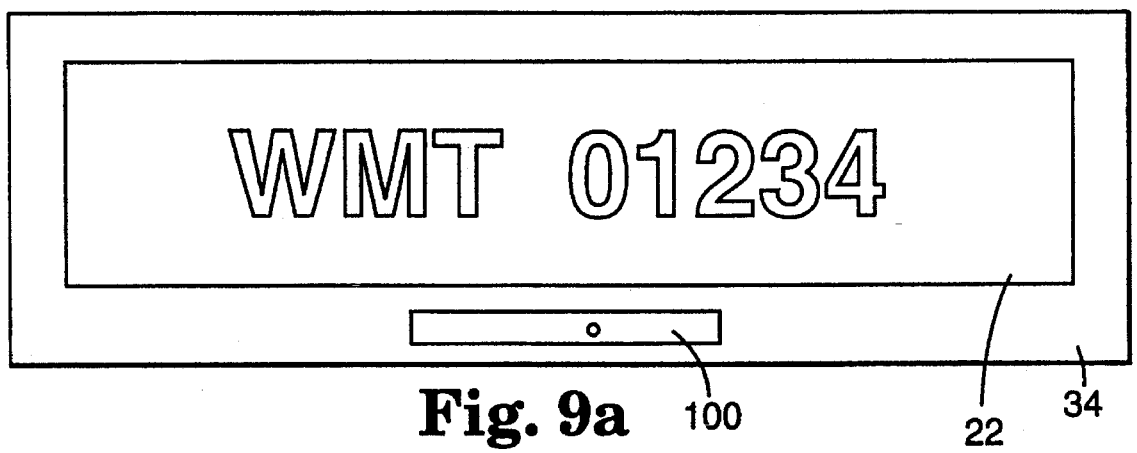
FIGS. 9a and 9b are front and exploded views of a the electronic license plate system with the antenna integrated with the holder portion.
Figure 9B:
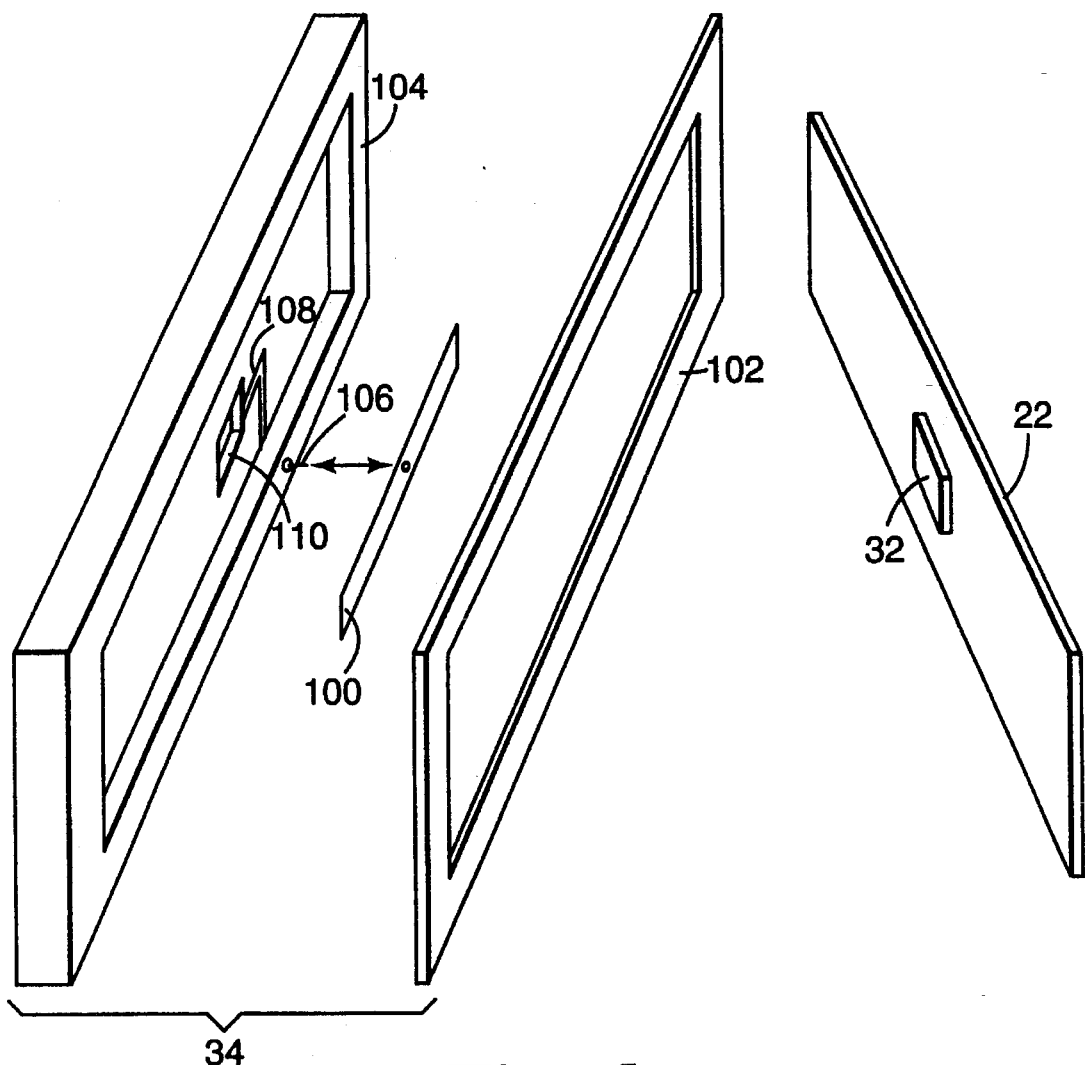

FIGS. 9a and 9b show an alternative antenna location that positions the antenna in the preferred license plate location while allowing the radiation pattern of the antenna to avoid the vapor coat layer of the retroreflective sheeting or the metal substrate of the license plate portion. FIG. 9a shows a front view of license plate portion 22 attached to license plate holder 34. While antenna 100 is physically behind license plate holder 34, it is shown through holder 34 in FIG. 9a to show its positioning with respect to license plate portion 22.

FIG. 9b shows an exploded view of the electronic license plate system. License plate portion 22 has identification device 32 mounted on its rear face. License plate holder 34 includes bracket structure 104 and radome 102. Antenna 100 is positioned on a peripheral edge of bracket structure 104, thereby avoiding license plate portion 22. Antenna 100 is shown as a microstrip dipole antenna, which is preferably made of copper, although any suitable conductive material may be used. Microstrip dipole antenna 100 is connected to probe feed 106 which is connected to transmission line 108. Transmission line 108 transmits signals from antenna 100 to the communications electronics, not shown. Instead of probe feed 106, aperture coupling may be used to electromagnetically transmit information from antenna 100 to transmission line 108. Opening 110 accommodates identification device 32 an allows for connection of identification device 32 with the electronic module. Radome 102 is placed around the periphery of bracket structure 104 and over antenna 100 to provide protection for antenna 100. Radome 102 may be laminated, welded or fastened in any other permanent or temporary manner. Bracket structure 104 is made of plastic or any suitable non-conductive material and is formed to support license plate portion 22. Because bracket structure 104 acts as the dielectric for microstrip dipole antenna element 100, the material used to manufacture bracket structure must have a suitable relative dielectric constant, such as a dielectric constant between 1.0 to 11.0.

Figure 10:
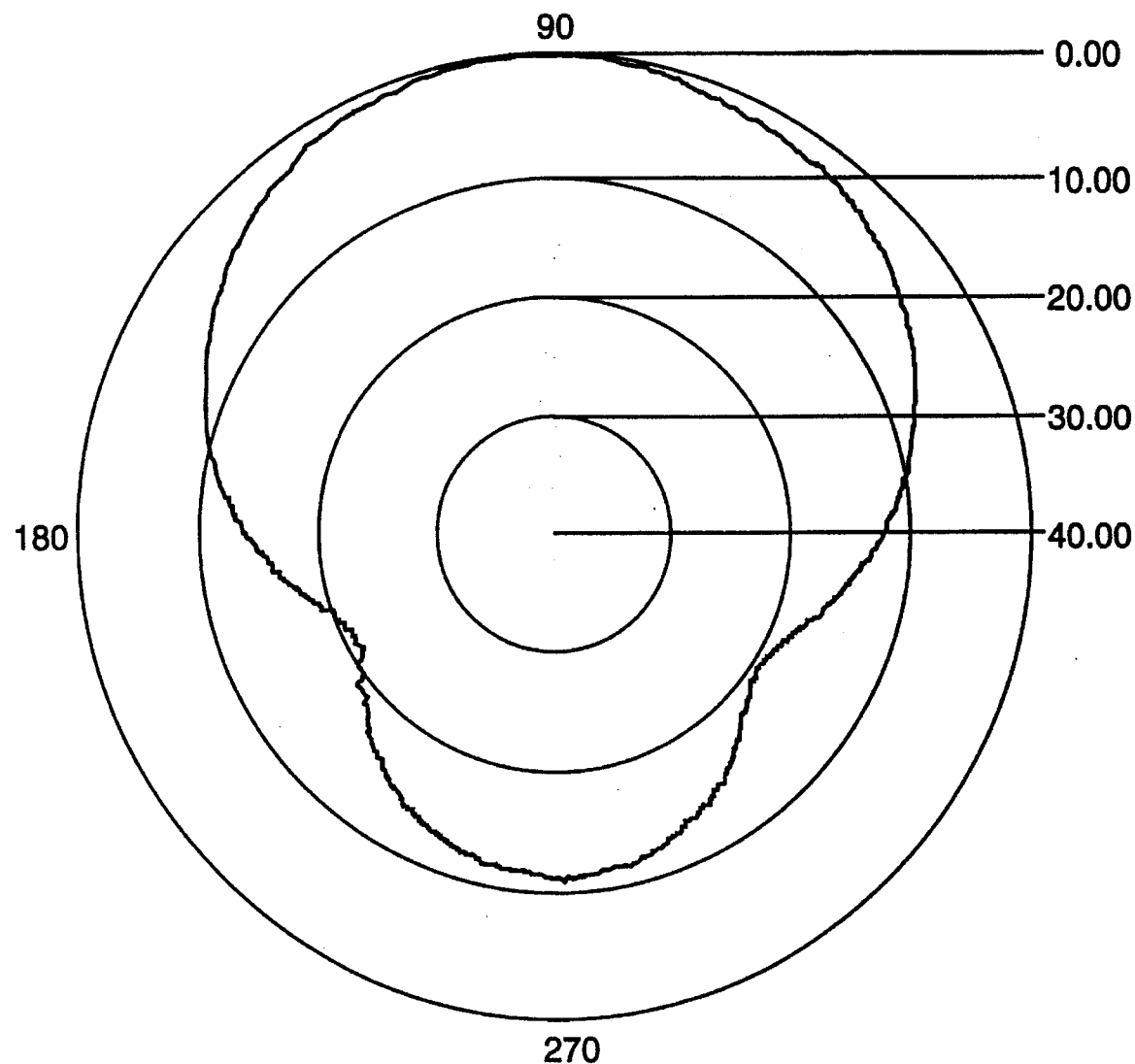
FIG. 10 is an antenna radiation pattern of the antenna shown in FIGS. 9a and 9b.

FIG. 10 shows an antenna radiation pattern for an embodiment of the present invention as shown in FIGS. 9a and 9b. FIG. 10 is an E-plane radiation pattern when antenna 100 is operating at 905 MHz. The gain of the antenna is approximately 4.12 dBi and the beamwidth of the radiation pattern in approximately 84.73 degrees. While a microstrip dipole antenna is shown in FIG. 9b, any planar antenna that fits along the outer periphery of support 104 may be substituted for a microstrip dipole antenna. For example, a microstrip patch or microstrip patch array may be used as antenna 100.

Figure 11A:
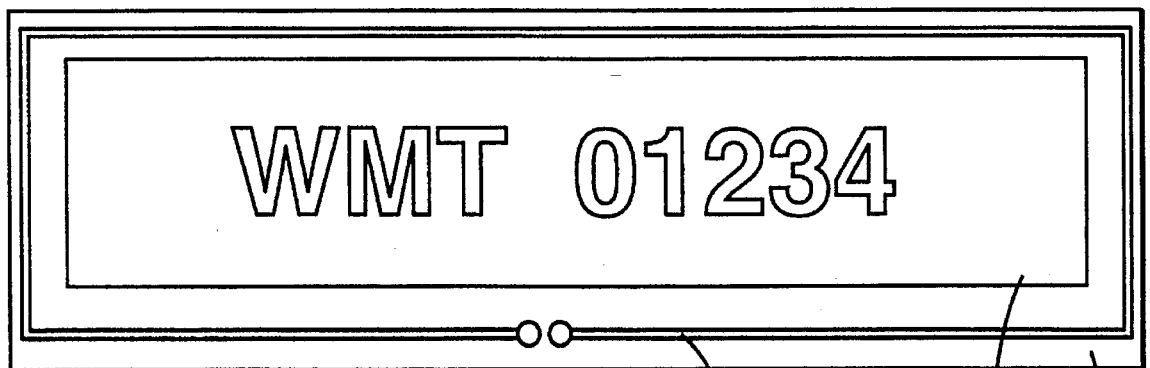
FIGS. 11a and 11b are front and exploded views of another embodiment of the electronic license plate system with the antenna integrated with the holder portion.
Figure 11B:
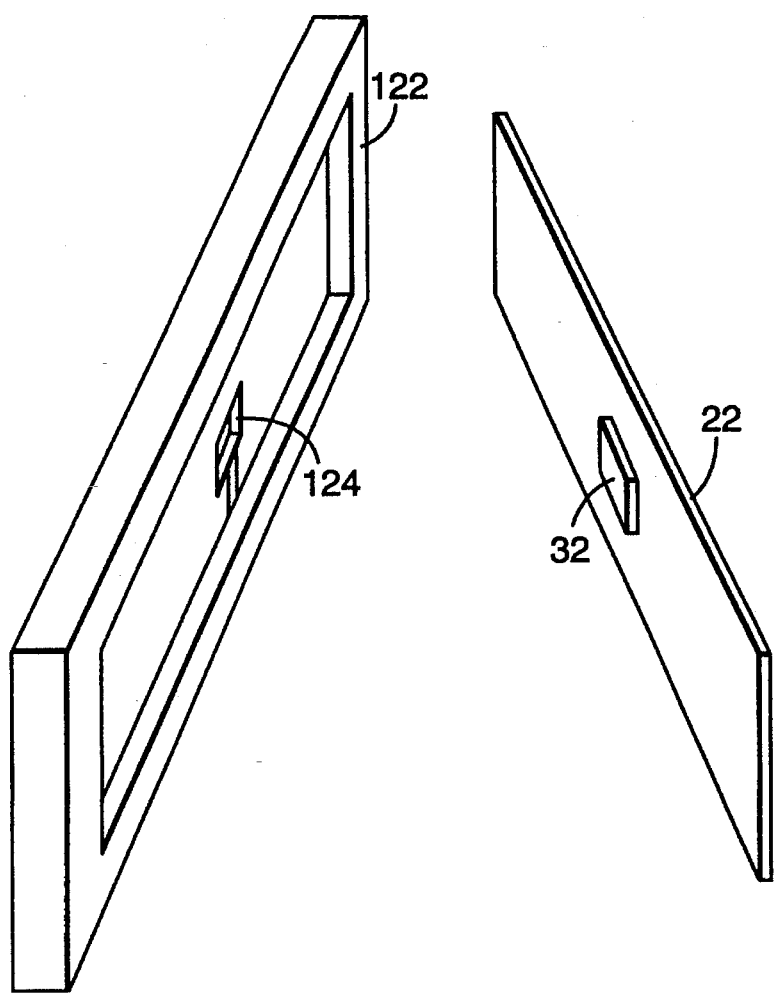
Figure 12:
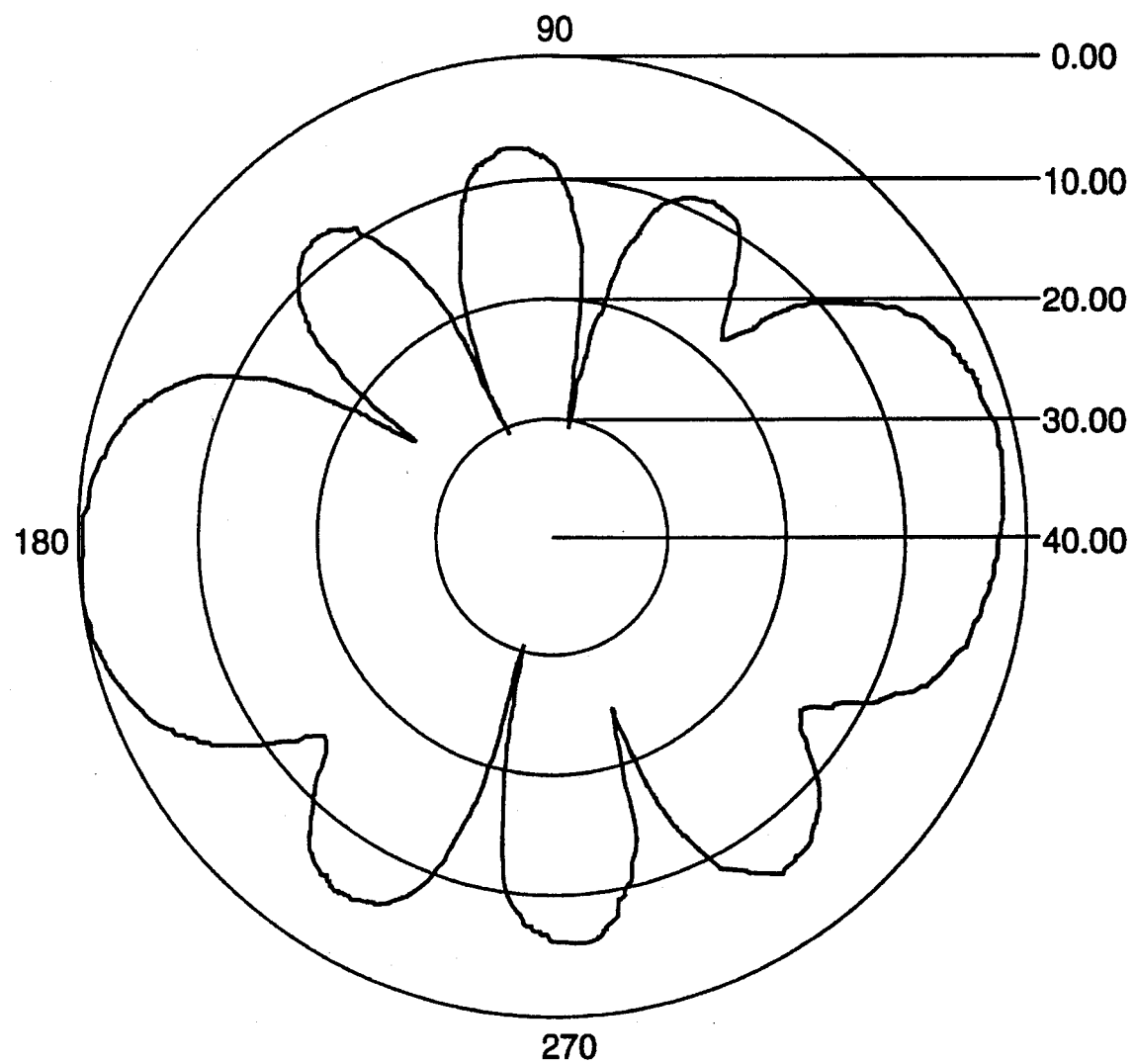
FIG. 12 is an antenna radiation pattern of the antenna shown in FIGS. 11a and 11b.

FIG. 11a and 11b show another example of another type of antenna that may be used with the present invention. FIG. 11a shows a front view of the electronic license plate system with license plate portion 22 and license plate holder 34. Similar to FIG. 9a, loop antenna 120 is shown through license plate holder 34 to illustrate its positioning with respect to license plate portion 22. Loop antenna 120 is actually positioned within or embedded in bracket structure 122. Bracket structure 122 may be layered, with loop antenna 120 positioned between the layers, may be hollow, with loop antenna 120 located in the hollow portion, or may be molded around loop antenna 120. Bracket structure 122 further is formed to support license plate portion 22 and to accommodate identification device 32, such as with opening 124, to allow connection to the electronics. FIG. 12 shows an E-plane radiation pattern for loop antenna 120 operating at 920 MHz. The gain of antenna 120 is approximately 0.93 dBi and the beamwidth approximately 38.65 degrees.

Because electronic license plate systems can be used for a variety of purposes that might require variable information, such as billing information for electronic toll collection or vehicle insurance information for authorities checking the expiration of such documents, it is desirable to store both permanent information and variable information in the system. Identification device 32 is embedded in license plate portion 22 to provide electronic information to the system, and more preferably, permanent electronic information. Permanent electronic information is information that should not change, such as the license plate number associated with a license plate or the vehicle identification number of the vehicle to which the license plate is attached. Identification device 32 may be any suitable electronic components, such as a write-once read-many (WORM) type memory device or an electrically programmable read only memory (EPROM). Because the permanent information stored in identification device 32 is information that should not change, it is preferable that the permanent information is programmed into identification device 32 at the time of manufacture or under the control of authorities such as the Department of Motor Vehicles before issuance of the license plate unit, which would include both the conventional visual information as well as the electronic information stored in identification device 32 and, possibly, antenna 30.

As mentioned above, the remaining electronics are not integrated with the license plate portion in the present invention. While the information stored in the identification device is preferably strictly controlled by some issuing authority, the electronics for reading the information from the identification device and for providing other communications, signal processing and data processing functions is preferably accessible to organizations other than just the issuing authority. Thus, as long as the issuing authority provides the communications protocol for communicating with the identification device, the remainder of the electronics can vary, based on the types of applications the electronics need to handle. The electronics could be add-on modules to be installed in existing vehicles or could be integrated into vehicles at the time of vehicle manufacturing. Moreover, by placing the electronics in areas other than within the license plate portion, the costs of replacing the license plate portion are reduced.

Referring back to FIG. 2, license plate holder/electronics portion 24 is comprised of two structures, license plate holder 34 and electronic module 36. License plate holder 34 is a mechanical fastening system for holding license plate portion 22 securely to the vehicle. In a simple embodiment, license plate holder 34 may be any fastener such as bolts or screws placed through holes in license plate portion 22 and screwed into a predetermined area on the vehicle. In other embodiments, however, license plate holder 34 may fasten license plate portion 22 in a such manner to protect tampering with identification device 32, as will later be described. Further, license plate holder 34 may include an interface between license plate portion 22 and electronic module 36 when electronic module is not placed in a proximate location with respect to license plate portion 22.

Electronic module 36 preferably resides in license plate holder portion 24 as shown in FIG. 2. Electronic module 36 may reside, however, in other areas of the vehicle, such as in the trunk or dashboard of the vehicle. Electronic module 36 contains communication electronics 38 and signal processing electronics 40. Communication electronics 38 includes antenna 30 in those embodiments where antenna 30 is not integrated into license plate portion 22. Communication electronics 38 further includes radio frequency (RF) electronics to transmit or receive an RF signal from antenna 30. RF electronics include those components well known in the art such as modulation and demodulation circuits for converting signals between digital and analog formats, a field strength detector, a receive detector, and a decoder for receiving signals and a transmit oscillator/modulator and a transmit power amplifier for transmitting the modulated RF voltage to antenna 30. Moreover, it is not necessary for both communication electronics 38 and signal processing electronics 40 to be placed together. For example, communications electronics may be placed in license plate holder portion 24 to minimized RF losses while signal processing electronics 40 could be placed in the trunk or dashboard of the vehicle.

Signal processing electronics 40 are used to encode or decode the signal to and from the RF electronics and may be a passive or active system. Signal processing electronics 40 make logic decisions based on instructions contained in the received signal and execute the transmission protocol. Moreover, using the information stored in identification device 32, they format a message into a digital bit stream to be transmitted, the formatted message sent to the transmit circuit of radiofrequency electronics in communication electronics 38. Signal processing electronics 40 may include a receiver decoder for decoding the digital signal into a binary bit stream, a protocol logic unit for decoding the protocols and may also include electronics monitoring the status of power source 42. Signal processing electronics 42 may further include electronics for data processing. Communications electronics 38 are preferably located close in proximity to antenna 30 to minimize RF losses. Thus, in an embodiment where antenna 30 is placed in license plate portion 22, it is preferable to place at least communications electronics 38 in license plate holder portion 24.

In the electronic license plate system of the present invention, identification device 32 is mounted on the license plate portion of the system. While license plate portion 22 interfaces with the electronics in holder 24, it is preferable that license plate portion 22 cannot be removed without destroying license plate portion 22 or identification device 32, rendering the system inoperable or transmitting an alarm signal to alert the authorities of potential tampering. Further, it may prevent electromagnetic communication using the system when an improper identification device is connected to the electronics in the vehicle. This ensures the accuracy of the permanent, vehicle-specific information sent from identification device 32 to an interrogating unit, and the integrity of the entire system. Examples of systems that prevent tampering with the electronic license plate are described in commonly-assigned U.S. patent application Ser. No. 08/439,366, entitled "Electronic License Plate Having a Secure Identification Device" to Bantli, filed even date herewith.

FIGS. 5a and 5b show a top view and a side cross-sectional view of a chip mounting device used in a second embodiment of the present invention. The second embodiment as shown in FIGS. 5a, 5b, 6, and 7 prevents the identification device mounted on the license plate portion of the system from being removed without destroying the device. This prevents removal of the identification device from a first vehicle and remounting the device on a second vehicle. Referring back to FIGS. 5a and 5b, identification chip 52, such as a semiconductor chip, a WORM type of memory or an EEPROM is mounted on flexible substrate 50. Flexible substrate may be any flexible circuit substrate, such as Kapton® film, manufactured by E.I. DuPont DeNemours, Wilmington, Del., having a first side 58 and a second side 60. Conductive lines 54, such as copper microstrip lines, electrically connect identification chip 53 to conductive feed through 56. Conductive lines 54 may be rolled copper with conductive adhesive or may be formed using any printed circuit board techniques, such as etching. Conductive feed through 56 are preferably copper, thereby providing a conductive path from first side 58 of flexible substrate 50 to second side 60 of flexible substrate 50. Connector 62 is mounted on second side 60 of flexible substrate 50. Feed throughs 56 have means for mounting a connector on second side 60 of substrate 50, such as surface mounting pads. Connector 62 may be any connector designated by system requirements, such as a three pin surface mounted connector, as shown. Three pin surface mounted connector 62 has three pins 66 (only one shown), each pin 66 connected to conductive feed through 56. Base 64 provides support to pins 66. The entire structure is preferably coated with a protective, con-conductive coating, such as Fluorad™, manufactured by Minnesota Mining and Manufacturing Company, St. Paul, Minn., to protect from corrosion. During the coating process, connector pins 66 are masked.

While the structure shown in FIGS. 5a and 5b may be mounted on a license plate, it is preferable to protect the identification chip and conductive lines as well as reduce the size of the package to make it more compact. Referring to FIGS. 5a and 6, identification chip 52 and conductive feed throughs 56 are positioned on flexible substrate 50 such that flexible substrate 50 can be folded, preferably in half lengthwise, such that identification chip 52 and conductive lines 54 are positioned on the inner periphery of the folded electronic module and connector 62 is positioned on the outer periphery of the folded electronic module. The folding may be achieved by die cutting the Kapton® film, as indicated by the dotted lines in FIGS. 5a and 5b, except for the portions of the film where conductive lines 54 are located. The inside of the folded electronic module can be filled with an epoxy or a non-conductive filler film to provide further structural integrity.

FIG. 7 shows the folded electronic module, or the identification device, installed in a license plate. A molded structure is formed around the folded electronic module shown in FIG. 6. Molded structure 68 is preferably formed of Valox®, manufactured by General Electric Corporation, and in a shape such that it can be snapped into the matched opening 33, shown in FIG. 3, of the rear aluminum, plastic or metal substrate of the license plate portion. Substrate 70 of the license plate portion has an outer side 74 and an inner side 72. Molded structure 68 is preferably pressed through outer side 74 of substrate 70 and is sized to snap into the opening and lock into place. Connector pins 66 extend out from inner side 72 of substrate 70 to connect with a matching connector in the license plate holder portion of the system.

Once identification device 32 is mounted on license plate portion 22, license plate portion is attached to license plate holder portion 24. License plate portion 22 may be permanently connected to license plate holder portion 24 and also permanently attached to the vehicle. In such an embodiment, the electronic license plate system 20 is permanently attached to the vehicle for the duration of the validity of the license plate. In such an embodiment, the entire license plate need be destroyed to remove it from the vehicle, thereby ensuring that the license plate may not be remounted in a holder of another vehicle.

Figure 13:
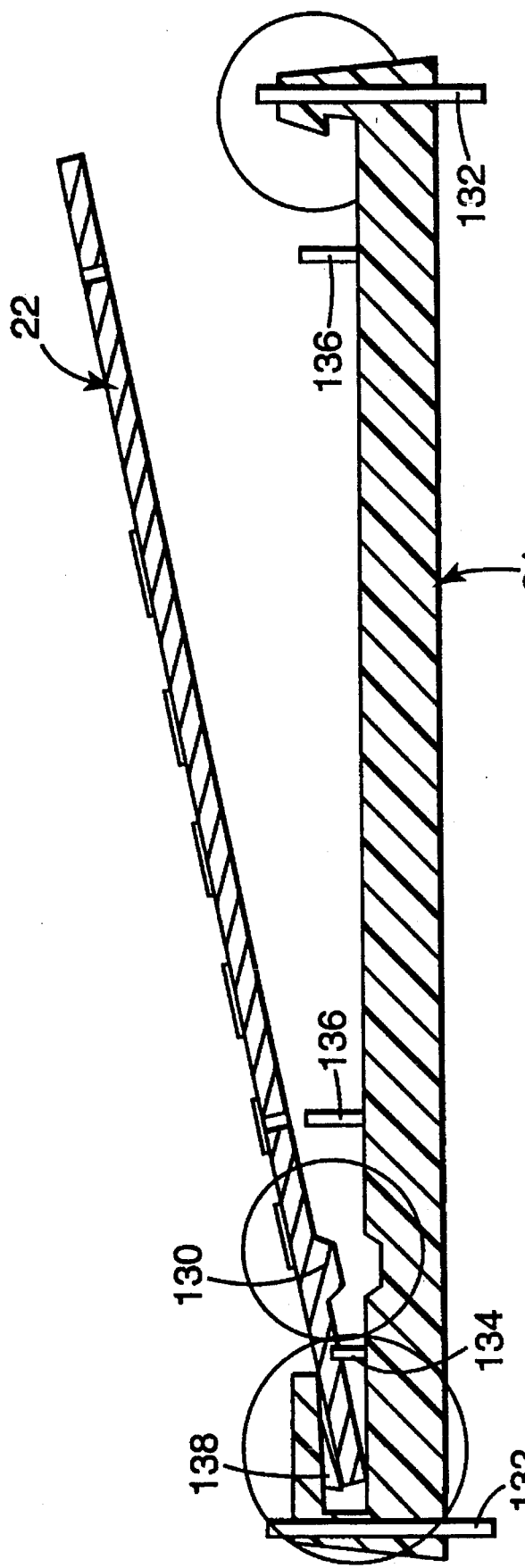
FIG. 13 is a side cross-sectional view of a license plate portion being inserted into a license plate holder portion.
Figure 14:
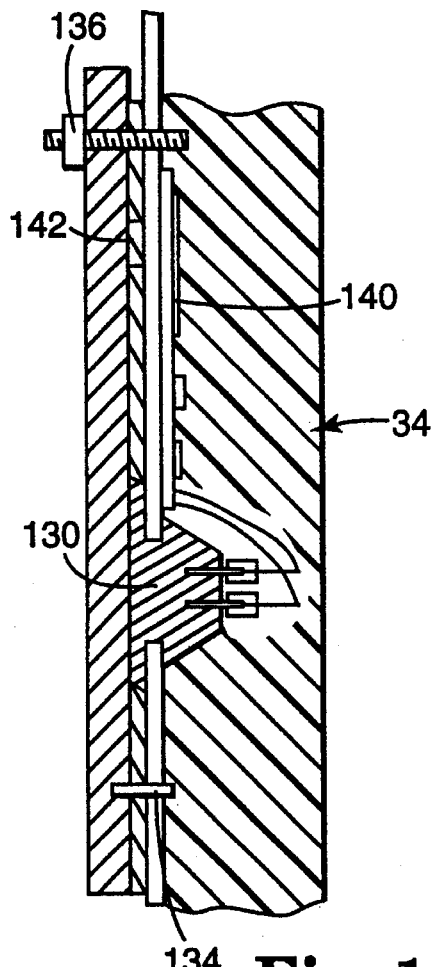
FIG. 14 is a side cross-sectional view of a license plate portion installed in a license plate holder portion.
Figure 15:
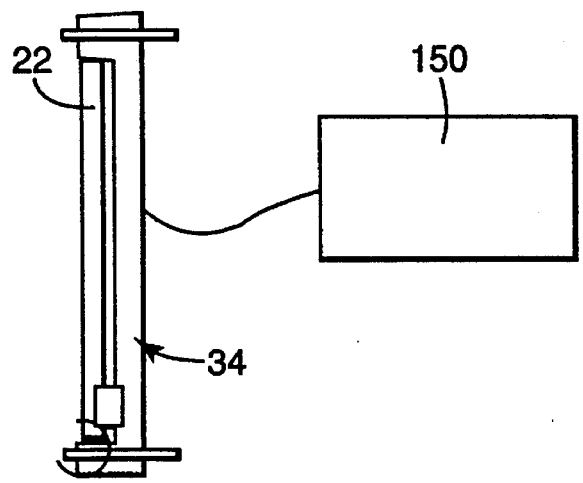
FIG. 15 shows the electronic license plate system of the present invention having a remote electronic module.

FIG. 13 shows license plate portion 22 being inserted into license plate holder 34. License plate holder 34 may be attached to the vehicle using any suitable fasteners, such as screws 132. Guide pin 134 ensures that license plate portion 22 is correctly aligned with license plate holder 34 such that connector 130 adequately connects the identification device mounted on license plate portion 22 to the electronics and aperture 142, if present, adequately aperture couples the antenna to the electronics. Before license plate portion is finally inserted into holder 34, connector 130 is connected to the electronics, such as a printed circuit board 140, as shown in FIG. 14 or a separate electronic module 150, as shown in FIG. 15. As mentioned above, even if some electronics reside in electronic module 150, other electronics, such as the communications electronics, may still be placed in holder 34. Once positioned within holder 34, license plate portion 22 may be secured using any suitable fastener, such as screws 136. Moreover, insertion guides or locks 138 may be used depending on the system requirements. If the license plate portion 22 is removable, guides are used. Guides 138 are rounded towards the license plate to make insertion and removal possible while at the same time pressing the license plate portion 22 toward holder 34. The force applied by guide 138 preferably ensures an environmental seal between license plate portion 22 and holder 34 to protect connector 130. If a permanent installation is desired, however, then guides 138 have a sharper edge and fit into matched slots in license plate portion 22, thereby securing themselves to the edges of the slots and preventing removal of license plate portion 22.

Although a preferred embodiment has been illustrated and described for the present invention, it will be appreciated by those of ordinary skill in the art that any method or apparatus which is calculated to achieve this same purpose may be substituted for the specific configurations and steps shown. This application is intended to cover any adaptations or variations of the present invention. Therefore, it is manifestly intended that this invention be limited only by the appended claims and the equivalents thereof.

We claim:

1. An electronic license plate system for use in an electronic vehicle communication system in which a plurality of remote traffic management stations communicate with the electronic license plate, comprising:

a license plate portion, including visual identification information and an identification means for storing restricted information, the restricted information including at least one type of vehicle identification information, and wherein the restricted information cannot be altered by the remote stations or by the vehicle;

information means for storing unrestricted information, wherein the unrestricted information can be altered by at least one of the remote stations or by the vehicle;

communication means, operatively connected to the identification means and to the information means, for processing communications with the remote stations;

antenna means for transmitting and receiving the communications with the remote stations;

attachment means fixed to the vehicle for replaceably attaching the license plate portion to the vehicle, such that the license plate portion can be replaced without having to replace the information means.

2. The electronic license plate system according to claim 1, wherein said attachment means comprises:

a holder for supporting said antenna and said license plate portion, said holder made of a dielectric material;

a radome for protecting said antenna;

connection means for connecting said antenna to said communication means.

3. The electronic license plate system according to claim 1, wherein said antenna is a dipole antenna.

4. The electronic license plate system according to claim 1, wherein said antenna is a microstrip patch antenna.

5. The electronic license plate system according to claim 1, wherein said antenna is a microstrip patch antenna array.

6. The electronic license plate system according to claim 2, wherein the antenna is electromagnetically connected to the communication means.

7. The electronic license plate system according to claim 2, wherein the antenna is electrically connected to the communication means.

8. The electronic license plate system according to claim 1, wherein said antenna is a loop antenna.

9. The electronic license plate system according to claim 1, wherein said electronic means is stored in said means for supporting said license plate portion.

10. The electronic license plate system according to claim 1 wherein the antenna forms a unitary structure with the license plate portion.

11. The electronic license plate system according to claim 1 wherein the antenna forms a unitary structure with the attachment means.

12. The electronic license plate system according to claim 1 wherein the restricted information includes the vehicle license plate number, license expiration date, or vehicle identification number.

13. The electronic license plate system according to claim 1 wherein the unrestricted information includes vehicle insurance or vehicle billing information.

14. The electronic license plate system according to claim 1 wherein the unrestricted information includes traffic status and road condition information.

* * * * *

UNITED STATES PATENT AND TRADEMARK OFFICE
CERTIFICATE OF CORRECTION

PATENT NO.: 5,608,391

DATED: March 4, 1997

INVENTOR(S): Heinrich Bantli, Edmund J. Ring, Wayne M. Thomas

It is certified that error appears in the above-identified patent and that said Letters Patent is hereby corrected as shown below:

Title page,

"Foreign Patent Documents", delete "6-32619" and insert therefore --6-232619--.

Column 4, line 11, delete "a" before the word "the".

Column 6, line 9, delete "an" and insert therefore --and--.

Column 9, line 47, delete "need" and insert therefore --needs--.

Signed and Sealed this

Sixteenth Day of December, 1997

Attest:

Attesting Officer

BRUCE LEHMAN

Commissioner of Patents and Trademarks